United States Patent Office.

FRANZ SOXHLET, OF MUNICH, BAVARIA, GERMANY.

REFINING STARCH-SUGAR.

SPECIFICATION forming part of Letters Patent No. 247,957, dated October 4, 1881.

Application filed May 10, 1881. (No specimens.)

*To all whom it may concern:*

Be it known that I, Prof. Dr. FRANZ SOXHLET, of Munich, in the Kingdom of Bavaria and Empire of Germany, have invented a certain new and useful Process in the Refining of Starch-Sugar, (Dextrose-Hydrate $C_6H_{12}O_6+H_2O$,) and in the production of the same with crystalline structure, which invention is fully set forth in the following specification.

Starch-sugar (glucose) as hitherto prepared, besides containing a larger amount of water than is necessary for water of crystallization, (viz., 9.09 per cent.,) contains in every one hundred parts, by weight, from twenty to thirty parts of unfermentable and uncrystallizable substances of a gummy nature. The separation of these substances, which, in the form of a sirup, are inclosed in the hard crystalline sugar particles, and the preparation of a pure starch-sugar (glucose) constitutes the object of the present invention.

The invention consists, first, in dissolving out the substances mentioned, with the aid of ethyl or methyl alcohol; and, secondly, in crystallizing grape-sugar by making a concentrated sirup, and allowing it to solidify at a temperature above 30° centigrade, (86° Fahrenheit.)

The following description will enable those skilled in the art to which it relates to use the invention.

The solid mass of grape-sugar is melted in a water-bath or steam-bath, and the resulting sirup is mixed with seventy per cent. to eighty per cent., by weight, of alcohol, eighty per cent., by volume, (Tralles,) or pure undiluted wood-spirit. This sirupy mass is next mixed with pulverized grape-sugar, and, in a place not too cool, allowed to solidify. Solidification takes place in about eight days, during which time the whole mass should be frequently stirred.

The above process, of course, can be used with sirup not yet rendered viscid for the production of the solid sugar; or the sirup can be allowed to solidify so far as to be able to knead, and then can be intimately mixed with seventy to eighty per cent., by weight, of alcohol or wood-spirit by means of suitable machinery; or, finally, solid starch-sugar (glucose) can be pulverized and mixed with the above-mentioned liquid in the proportion indicated.

The amount of water in the mixture of sirup and alcohol must be such that there will be no separation afterward at common temperatures. For a strong evaporated sugar-sirup a more diluted spirit is used, and for a weak sirup a more concentrated spirit. Anhydrous wood-spirit may also be employed. The liquefied mass thus produced in one of the ways described is pressed by means of a powerful filter-press, hydraulic press, or centrifugal machine. If the filter-press is used a further addition of sugar is recommended; but if the centrifugal press, on the contrary, a further addition of the spirit.

All the operations are carried on as far as possible in closed vessels, in order to prevent loss of the spirit by evaporation. The pressing, also, should be as powerful as possible, so that the pressed mass be dry and powder-like and not of a gummy consistency. The alcohol or wood-spirit is separated from the pressed cakes or the mass from the centrifugal machine by distilling it off in vacuum before or after the said cakes are mixed with water. The alcohol is collected in a cooled condenser. The sugar, free from spirit, is mixed with water sufficient to allow of its complete decolorization by means of animal charcoal. After complete decolorizing by the animal-charcoal the sirup is evaporated in a vacuum at a temperature not above 60° centigrade, (140° Fahrenheit.)

For the preparation of a perfectly dry starch-sugar, with a chalky or porcelain-like fracture, without a distinct crystalline form, the sirup is evaporated to a specific gravity of 1.33 to 1.36 (36° to 39° Baumé) at 60° to 65° centigrade, (140° to 149° Fahrenheit.) If the starch-sugar (glucose) is allowed to solidify in molds with smooth faces, loaf-sugar with a smooth shining exterior surface is obtained.

The formation of transparent hard starch-sugar (glucose) with a distinct crystalline structure, in which form the starch-sugar (glucose) has heretofore never been made either in small or large quantity, is based on the following hitherto unknown fact: Starch-sugar (glucose) at ordinary temperatures solidifies in opaque wart-like microscopic tablet-formed crystals; but at a temperature above 30° centigrade (86° Fahrenheit) in very concentrated solution it crystallizes in transparent column-formed crystals, easily visible to the naked eye. A solution of starch-sugar (glucose) containing only small quantities of foreign substances is concentrated until the sirup shows at a temperature of 90° centigrade (194° Fahrenheit) a specific gravity of 1.37 to 1.48, (about 40° to 46° Baumé,) best about 1.40 to 1.42. If during the evaporation, or when it is interrupted, the sirup becomes cloudy, there is enough of crystals present to bring about crystalline solidification; but if the sirup remains clear, then a portion heated to 80° to 90° centigrade (176° to 194° Fahrenheit) must be vigorously mixed and stirred until it becomes cloudy, and this must be mixed with the rest of the sirup. The sirup is then filled into the molds. In order to make the viscid sirup flow better, it is preferable to heat it to 80° to 90° centigrade (176° to 194° Fahrenheit) before letting it flow into the molds. The crystallization takes place most rapidly when the mass is cooled to a temperature of 35° to 50° centigrade, (95° to 122° Fahrenheit,) and kept at this temperature (best on a water-bath) as constantly as possible till complete solidification. The temperature at which the mass is to be kept depends on the concentration of the sugar solution and its purity, as well as on the more or less granular character of the product it is desired to obtain. For a less pure sugar solution, a lower temperature of 35° to 40° centigrade, (95° to 104° Fahrenheit;) for a more pure, a temperature of 40° to 50° centigrade (104° to 122° Fahrenheit) is employed. Solidification takes place in two or three days. The molds must then be turned over in order to allow the small portion of the remaining sirup to solidify. The sugar-forms are withdrawn from the molds while still in a moist condition, and are allowed to dry at ordinary temperatures in a dry place. The sirup containing alcohol is preserved, and the alcohol is recovered by distillation, best in vacuum with a cooled condenser, while the sugar, after decolorization, may be used as starch-sugar (glucose) sirup, or for the preparation of sugar confectionery, or, if it be crystallizable, for the above-mentioned process; or it may be reheated with sulphuric acid for solid starch-sugar, (glucose.)

I claim—

1. The method of purifying starch-sugar (glucose) by dissolving the foreign substances, which, for the most part, are unfermentable, and inclosing the solid sugar particles, with the aid of ethyl or methyl alcohol, and then separating the thin liquid sirup from the solidified glucose by means of presses, centrifugal machines, or other suitable appliances, substantially as described.

2. The method of preparing solid transparent starch-sugar (glucose) or dextrose hydrate $(C_6H_{12}O_6+H_2O)$ with a distinct crystalline structure by making a concentrated starch-sugar (glucose) and allowing the same to solidify at a temperature above 30° centigrade, (86° Fahrenheit,) substantially as described.

FRANZ SOXHLET.

Witnesses:
SAMUEL SPACKMAN,
EMIL HENZEL.